United States Patent
Chidurala et al.

(10) Patent No.: US 11,893,037 B1
(45) Date of Patent: Feb. 6, 2024

(54) DYNAMIC CODE GENERATION UTILITY WITH CONFIGURABLE CONNECTIONS AND VARIABLES

(71) Applicant: Bank of America Corporation, Charlotte, NC (US)

(72) Inventors: Kavitha Chidurala, Narsingi (IN); Yash Gupta, New Delhi (IN); Manthiram Arumuganainar, Tamil Nadu (IN); Daniel Joseph Hines, III, Marvin, NC (US); Deepak Gupta, Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/952,219

(22) Filed: Sep. 24, 2022

(51) Int. Cl.
  *G06F 16/25* (2019.01)
  *G06F 11/36* (2006.01)
  *G06F 8/30* (2018.01)

(52) U.S. Cl.
  CPC .............. *G06F 16/254* (2019.01); *G06F 8/30* (2013.01); *G06F 11/3604* (2013.01)

(58) Field of Classification Search
  CPC .................................................... G06F 16/254
  USPC ......................................................... 707/602
  See application file for complete search history.

(56) References Cited

U.S. PATENT DOCUMENTS

| | | | |
|---|---|---|---|
| 7,720,804 B2 | 5/2010 | Fazal et al. | |
| 7,870,016 B2 | 1/2011 | Fazal et al. | |
| 7,899,915 B2 | 3/2011 | Reisman | |
| 8,768,877 B2 | 7/2014 | Bhatia et al. | |
| 9,081,875 B2 | 7/2015 | James et al. | |
| 9,563,670 B2 | 2/2017 | Wasson et al. | |
| 10,616,203 B2 | 4/2020 | Hankins et al. | |
| 10,680,958 B2 | 6/2020 | Guan et al. | |
| 10,778,543 B2 | 9/2020 | Guan et al. | |
| 11,025,513 B2 | 6/2021 | Guan et al. | |
| 2008/0097816 A1* | 4/2008 | Freire | G06Q 10/10 705/7.26 |
| 2014/0310231 A1* | 10/2014 | Sampathkumaran | G06F 16/254 707/602 |
| 2015/0254171 A1* | 9/2015 | Harden | G06F 11/3684 717/124 |
| 2017/0063907 A1 | 3/2017 | Muddu et al. | |
| 2017/0220654 A1* | 8/2017 | De | G06F 16/254 |
| 2019/0238424 A1 | 8/2019 | Guan et al. | |

FOREIGN PATENT DOCUMENTS

| | | |
|---|---|---|
| CA | 2492591 A1 | 2/2004 |
| CN | 106663143 B | 12/2019 |
| KR | 101812459 B1 | 1/2018 |

* cited by examiner

*Primary Examiner* — Syling Yen
(74) *Attorney, Agent, or Firm* — Banner & Witcoff, Ltd.

(57) ABSTRACT

A dynamic code generation process with configurable connections and variables for extraction, transformation, and load (ETL) processing and validation is disclosed. A code generator loads an input requirement document and a configuration file, and generates workflows, database objects, and parameters. Database code is deployed in a database, ETL code is deployed in an ETL repository, and server code is deployed in an ETL server. A code validator reads the ETL code from the ETL repository and the database code from the database, and performs in-built stage unit testing. The code validator performs a quality check, metadata validation, definition comparisons, and outputs validation results.

13 Claims, 8 Drawing Sheets

Sample Configuration File

| Source_Table_Name | Target_Table_Name | Source_Connection | Target_Connection | Source_Desc |
|---|---|---|---|---|
| 250-1 ... 250-N | 252-1 ... 252-N | 254-1 ... 254-N | 256-1 ... 256-N | 258-1 ... 258-N |

| Target_Desc | SQ_Desc | Mapping_Desc | Workflow_Desc | Expression_desc |
|---|---|---|---|---|
| 260-1 ... 262-N | 262-1 ... 262-N | 264-1 ... 264-N | 268-1 ... 268-N | 270-1 ... 270-N |

| Param_file | folder_name | schema_name | session_name |
|---|---|---|---|
| 272-1 ... 272-N | 274-1 ... 274-N | 276-1 ... 276-N | 278-1 ... 278-N |

DYNAMIC CODE GENERATION UTILITY WITH CONFIGURABLE CONNECTIONS AND VARIABLES

TECHNICAL FIELD OF DISCLOSURE

The present disclosure relates to backend electrical computers and digital processing systems for virtual machine tasks, process management, and task management/control with mutual exclusion mechanisms to extract, transform, and load data from myriad source machines or datastores via a dynamic code generation utility with configurable connections and variables to store data across multiple processes for presentation to frontend devices.

BACKGROUND

In distribution computing systems where data needs to be extracted from myriad backend machines and datastores, transformed (e.g., cleaned, sanitized, scrubbed, put into a uniform format), and loaded into an output data container or the like for presentation to, access by, or use by frontend machines or systems, technical problems and substantial limitations exist in traditional extract/transform/load (ETL) computing processes when the quantity of back-end sources from which data is to be extracted is extremely large and the staging process is monotonous and redundant. As an example, in some companies, the number of back-end systems from which extraction is required can easily exceed hundreds of thousands (100,000+) of individual personal computers, servers, splunk systems, databases, datastores, spreadsheets, tables, or the like, and many requests for data from tens of thousands (10,000+) of users may be made of many different data sources on one or more of each of the foregoing, which increases the extraction demands even more.

In many ETL architectures, there are staging layers, which are simple and straightforward loads from source locations to staging locations with minimal transformations. Usually, the number of staging tables in data warehousing projects is very large leading the developers to create numerous mappings with same logic repeatedly. This leads to monotonous development work with experienced programmers and developers spending a tremendous amount of time working on temporary mappings with no logic thereby wasting development resources. These same mappings then undergo testing and peer-review process with significant documentation making the overall process redundant and wasting even more development resources and time. It can result in programmer and developer burnout due to the laborious, monotonous, and repetitive nature of the mapping process, and can be prone to user error due to the manual mapping process and staging. This further complicates the ETL process and collectively presents tremendous technological problems and potentially unsustainable and unsatisfiable ever-increasing parallel processing requirements and demand for deployment resources.

Hence there is a long felt and unsatisfied need in the field of staging processes for ETL systems for backend electrical computers and digital processing systems to handle virtual machine tasks, process management, and task management/control to extract, transform, and load data from myriad sources via a dynamic code generation utility with configurable connections and variables.

SUMMARY

In accordance with one or more arrangements of the disclosures contained herein, solution(s) are provided to address one or more of the shortcomings in the field of ETL systems by, inter alia, generating deployable ETL code (across the ETL universe) from a requirement document (i.e., business functionalities required by a business unit) as an input parameter in a single click or selection, creating staging tables automatically without any developer interaction, automatically executing (i.e., deploy) mappings, executing inbuilt test cases and generating unit-test result documents for quick data assessment and performing peer review, capturing the test results for audit trails, automatically generating and deploying databases and Unix components, and providing an efficient and accurate end-to-end development utility and process with reduced demands on programmer and developer resources for staging data.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, code deployable on any ETL tool can be generated by a click of a button just from a requirement specification, which can be in any form such as, for example, an Acrobat pdf, an image, a document, a spreadsheet, etc. The code can also generate and deploy database(s) and Unix component(s) used in the code. This a complete solution that takes care of end-to-end development from scratch. It can also have an in-built testing engine that executes test cases on the loaded data and captures the test results and can generate a unit test document. The same process can be re-utilized to perform peer review and testing and can also be used for code quality checks while testing. This utility reduces the staging layer development time and improves the quality of the developed code.

In some arrangements, a dynamic code generation process with configurable connections and variables for extraction, transformation, and load (ETL) processing and validation can be used. The process can utilize a code generator component and a code validation component.

In some arrangements, the code generator can load an input requirement document and a configuration file from a source, and convert the input requirement document into an ETL template. The code generator can load the ETL template. The code generator can generate workflows, database objects, and parameters based on the ETL template and the configuration file. The code generator can deploy the workflows as ETL code in an ETL repository. The ETL code can correspond to ETL transformations to be performed based on the input requirement document.

In some arrangements, the code generator can deploy the database objects as database code in a database, and server code in an ETL server corresponding to the ETL code and the database code.

In some arrangements, a code validator can load the ETL code, the database code, and the server code. The code validator can execute in-built stage unit test cases based on the ETL code, the database code, and the server code. The code validator can also capture in a unit testing document the validation results of the in-built stage unit test cases on the ETL code, the database code, and the server code.

In some arrangements, the input requirement document can comprise one or more of: source information, transformation options, pre-staging information, staging information, provisional staging data, target provisional data, and/or provisional transformation data.

In some arrangements, the configuration file can comprise one or more of: a source table name, a target table name, a source connection, a target connection, a source description, a target description, a mapping description, a workflow description, an expression description, a parameter filename for a parameter file, path information for the parameter file, a schema name, and/or a session name.

In some arrangements, the ETL code can be compiled by the code generator into an ETL tool, and the server code can be compiled into Unix code stored on a Unix server.

In some arrangements, the validation results can be compared by the code validator against a checklist and/or be published by the code validator for peer review.

In some arrangements, one or more various steps of processes disclosed herein can be implemented in whole or in part as computer-executable instructions stored on computer-readable media.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (e.g., 100, 110, 112, 116, 120, 122, 180-1 . . . 180-N, 190-1 . . . 190-N, etc.) can include one or more general-purpose, customized, configured, special-purpose, virtual, physical, and/or network-accessible devices such as: administrative computers, application servers, clients, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, servers, smart devices, streaming servers, tablets, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc. (e.g., 100A), display(s) and/or input interfaces/devices (e.g., 100B), network interfaces, communication buses, or the like (e.g., 100C), and memories or the like (e.g., 100D), which can include various sectors, locations, structures, or other electrical elements or components, software, computer-executable instructions, data, modules, processes, routines etc. such as generically identified sub-elements 100-D1, 100-D2, 100-D3 . . . 100-DN (similar sub-elements not shown for simplicity purposes for computers, machines, and the like referenced above, etc.), although any number of components, modules or the like may be utilized.

Other specific or general components, machines, or the like are not depicted in the interest of brevity and would be understood readily by a person of skill in the art. One or more sample(s) of the foregoing, some of which are expressly depicted, can be seen in FIG. 1A along with one or more sample associated components, subcomponents, related elements, sub-elements, etc.

As used throughout this disclosure, software, computer-executable instructions, data, modules, processes, routines, or the like can include one or more: active-learning, algorithms, alarms, alerts, applications, application program interfaces (APIs), artificial intelligence, approvals, attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning, middleware, modules, namespaces, objects, operating systems, platforms, processes, protocols, programs, rejections, routes, routines, security, scripts, tables, tools, transactions, transformation functionality, user actions, user interface codes, utilities, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc. 170.

Sample local and/or distributed memory (or the like) contents in accordance with the foregoing may include, as shown in sample structure 106, software, computer-executable instructions, data, modules, process, routines or the like, such as: Alarm(s)/Alert(s) & Module(s) & Data; Application Module(s) & Data; Artificial Intelligence Module(s) & Data; Browsers & Interfaces Module(s) & Data; Business Requirement Document Module(s) & Data; Checklist Module(s) & Data; Code Generation File Module(s) & Data; Code Validation Module(s) & Data; Comparison Result Module(s) & Data; Configuration File Module(s) & Data; Dashboards/UI/Web Front End Access Module(s) & Databases; Data Flow Check Module(s) & Data; Data Flow Module(s) & Data; Database Module(s) & Data; Definition Comparison Module(s) & Data; Deployable Database Code Module(s) & Data; Deployable ETL Code Module(s) & Data; Deployment Module(s) & Data; Document Conversion Module(s) & Data; ETL Repository Module(s) & Data; Extraction Module(s) & Data for Backend Machines/Data; Fault Handling Module(s) & Data; Inbuilt Stage Unit Test Case Module(s) & Data; Load Balancing Module(s) & Data; Load Module(s) & Data for Front End Devices; Logging & Log(s) & Module(s) & Data; Machine Learning Module(s) & Data; Mapping Module(s) & Data; Metadata Validation Module(s) & Data; Namespaces & Module(s) & Data; OS/Networking Component(s) & Module(s); Parameter File Module(s) & Data; Permissions & Security Module(s) & Data; Raw Data & Module(s) & Data; Request(s) & Module(s) & Data; Requirement Document Module(s) & Data; Response(s) & Module(s) & Data; Routes & Routing Module(s) & Data Quality Check Module(s) & Data; Scheduler Module(s) & Data; Security Module(s) & Data; Server Detail Module(s) & Data; Server Table & IP Address Module(s) & Data; Standard ETL Template Module(s) & Data; Structured or Unstructured Data; Template File Module(s) & Data; Transform Module(s) & Data; Transformation Logic Module(s) & Data; Unit Testing Document Module(s) & Data; Unix code Module(s) & Data; Workflow Module(s) & Data; and Wrapper Script Module(s) & Data.

The foregoing software, computer-executable instructions, data, modules, processes, routines, or the like, when executed-individually and/or collectively across-one or more various computers, machines, or the like (or any components therein) may cause ASICs, processor(s), core(s), executor(s), etc. to perform one or more functions relevant to, or that may be used in, one or more aspects of this disclosure.

As used throughout this disclosure, computer "networks," topologies, or the like (e.g., 160, etc.) can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based protocol. One or more sample(s) of the foregoing, some of which are expressly depicted, can be seen in FIG. 1 along with their associated components, subcomponents, related elements, sub-elements, etc.

Figure 1A:
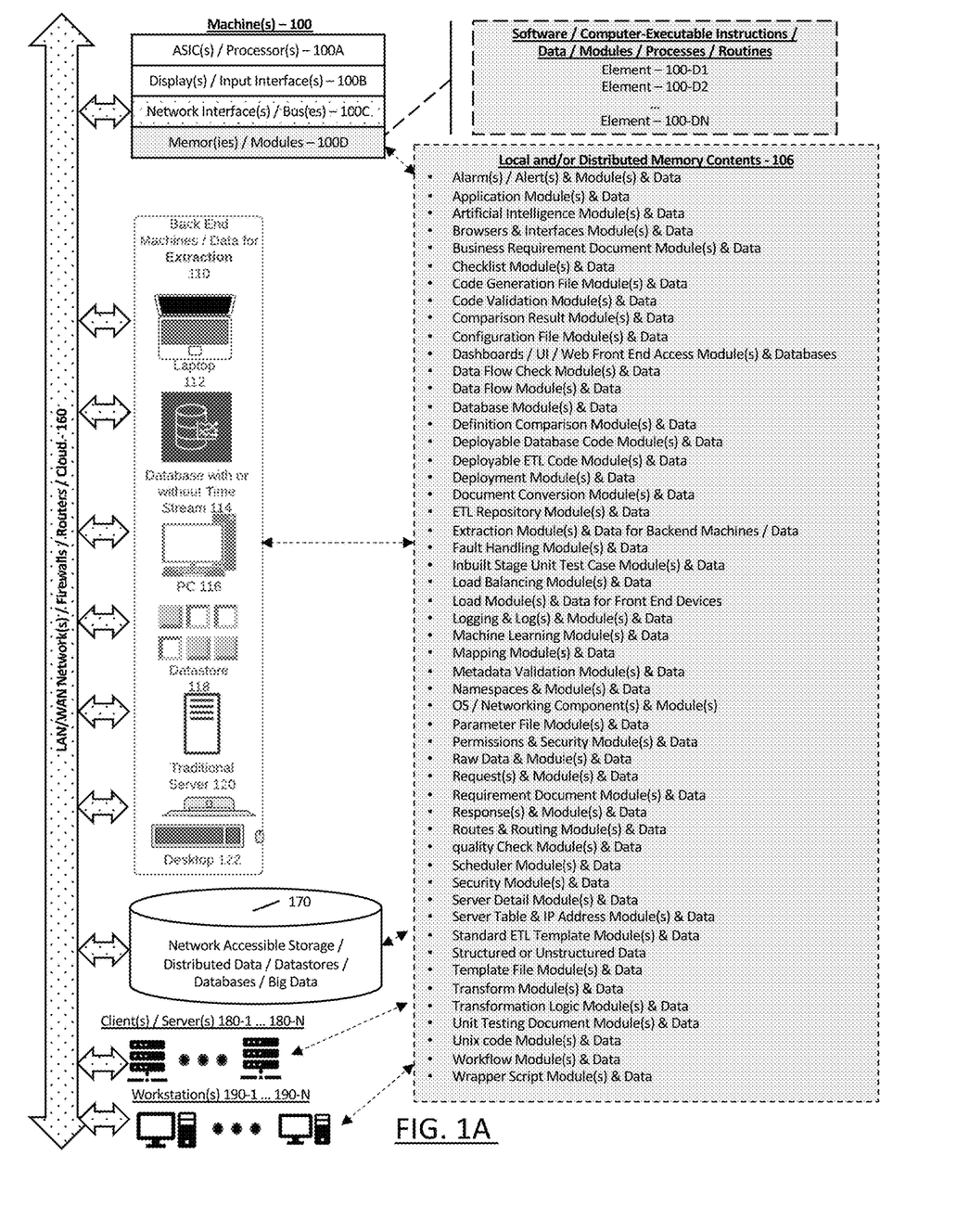
FIG. 1A depicts exemplary operating environment(s) and functionality to implement one or more backend electrical computers and digital processing systems to handle virtual machine tasks, process management, and task management/control to extract, transform, and load data from myriad sources via a dynamic code generation utility with configurable connections and variables to store data across multiple processes for presentation to frontend devices in one or more aspects of this disclosure.

FIG. 1A also depicts sample backend machines and data sources from which an ETL extraction process can be performed in accordance with one or more aspects of this disclosure. In particular, sample backend machines and data sources 110 could be laptops 112, databases with or without time streams 114, PCs 116, datastores 118, traditional servers 120, desktops 122, or any other machines or data storage devices including, but not limited to, machine(s) 100, NAS/distributed data/datastores/databases/big data 170, client(s)/server(s) 180-1 . . . 180-N, and/or workstation(s) 190-1 . . . 190-N.

Accordingly, and as described briefly above, a skilled artisan will understand that FIG. 1A depicts exemplary operating environment(s) and functionality for one or more backend electrical computers and digital processing systems for virtual machine tasks, process management, and task management/control with mutual exclusion mechanisms to extract, transform, and load data from myriad sources via a dynamic code generation utility with configurable connections and variables to store data across multiple processes for presentation to frontend devices in one or more aspects of this disclosure.

Figure 1B:
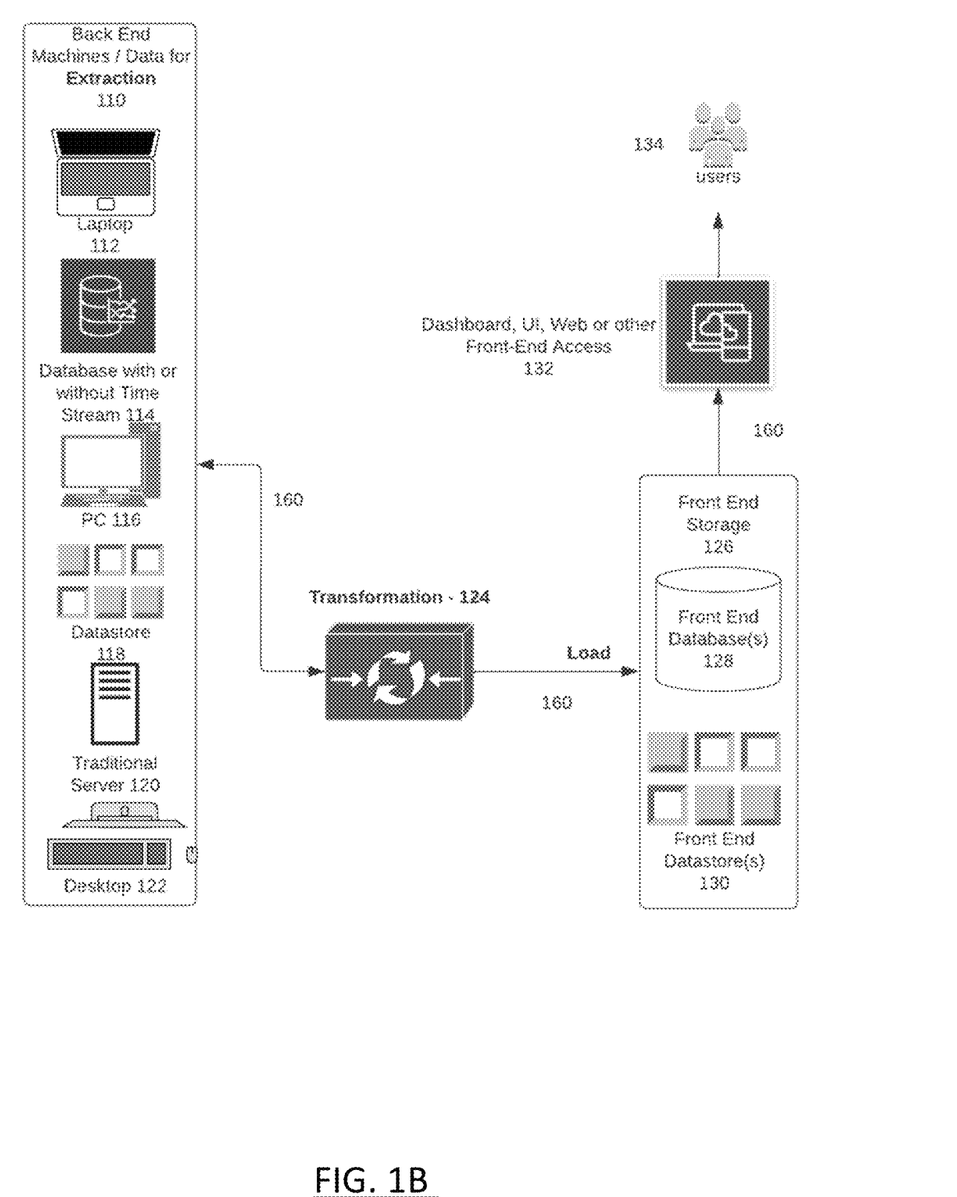
FIG. 1B depicts a high-level sample illustration of an extraction, transformation, and load process that can be utilized in conjunction with one or more aspects of this disclosure.

By way of non-limiting reference and explanation, FIG. 1B depicts a high-level sample illustration of an extraction, transformation, and load (ETL) process that can be utilized in conjunction with one or more aspects of this disclosure. Sample back-end machines and data for "extraction" 110 are coupled to transformation processes and logic 124 that is used to transform the extracted data into the desired format and is then loaded into front end storage 126 such as front-end database(s) 128 and/or front-end datastore(s) 130. Users 134 can then access the front-end data via a dashboard, user interface, web browser, or other front-end access means 132.

Figure 2A:
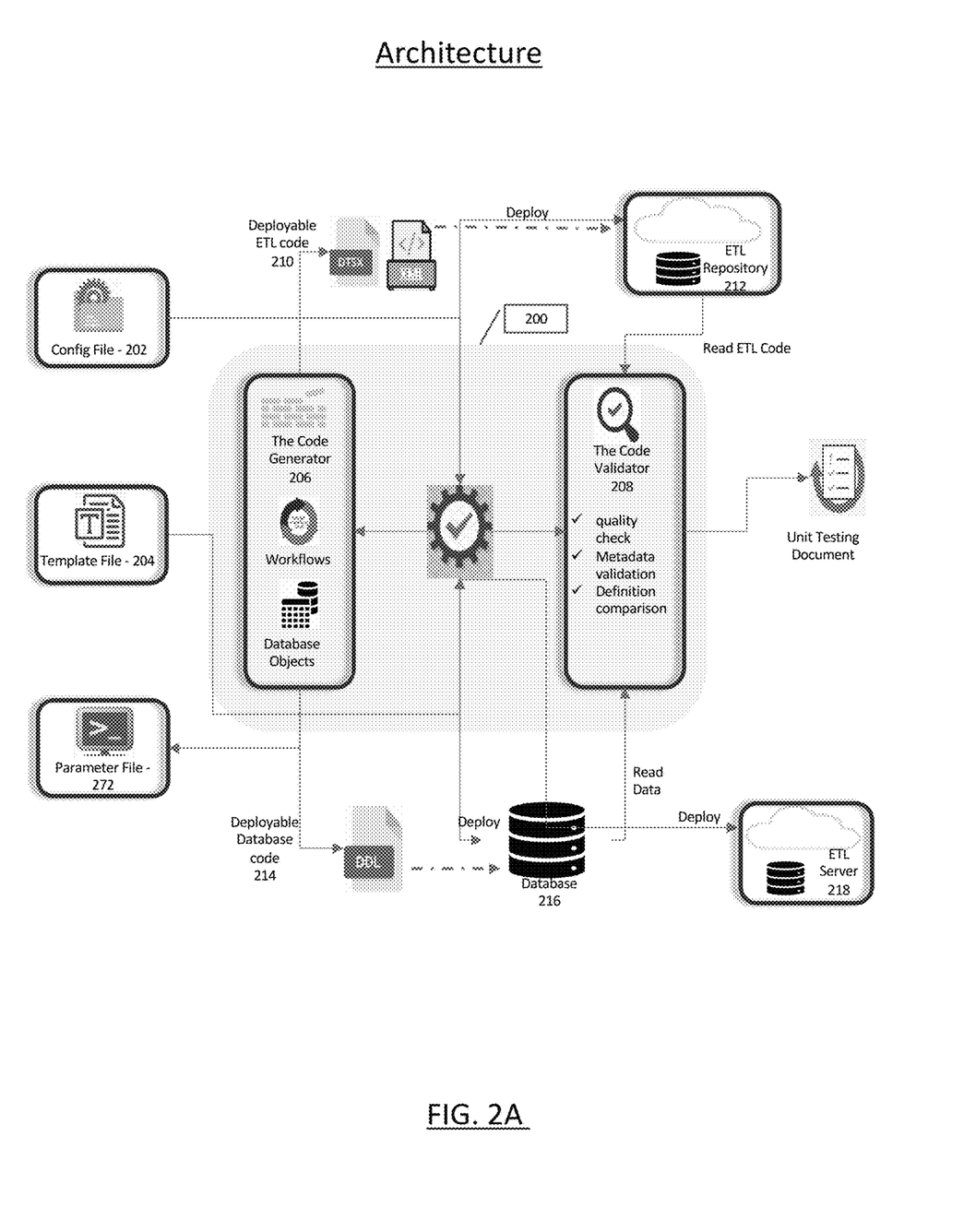
FIG. 2A is a sample architecture for a dynamic code generation utility with configurable connections and variables that can be utilized in conjunction with one or more ETL or other aspects of this disclosure.

By way of non-limiting reference and explanation, FIG. 2A is a sample architecture for a dynamic code generation utility with configurable connections and variables that can be utilized in conjunction with one or more ETL or other aspects of this disclosure.

An ETL tool 200 reads data from a source and loads the data, after doing some transformation or modification to the data, to the target. The logic embedded in the tool 200 is defined by a reference document or configuration file 202, such as, for example, a spreadsheet. For example, it can specify that the case of the data is to be changed (e.g., from upper case to lower case), filtering the data to only retain one year's worth of data, trimming the data for any white spaces, etc.

This configuration file or reference document 202 and the embedded logic can be utilized to create a mapping, which is the metadata as to what to do with the data. It contains the source and target information. It contains what kind of manipulation is to be performed on the data. Sessions can then be created to specify how to read the data, how to write the data, how to connect to the sources and targets, and perform configuration related functions. Workflows can then be scheduled to run on daily, weekly, or monthly or quarterly frequency. Testing on these codes can be performed and checks can be made as to whether the results are expected or not. Resulting documents can then be generated.

More specifically, ETL tool 200 is divided into two parts: the code generator 206 and the code validator 208. The code generator can receive input files such as configuration file 202 that has the logic return in words and a template file that is code. N-number of mappings sessions and workflows are generated automatically.

Those workflows are then deployed as ETL code 210 and stored in an ETL repository 212. Database code 214 will similarly be deployed and stored in a database 216. Server Unix code is generated and deployed to ETL server 218. Parameters relating to execution of the ETL code are stored in a parameter file 272 by the code generator.

The code validator 208 reads the ETL code from the ETL repository 212 and the database 216 to perform a quality check, validate metadata, and perform definition comparisons. The code validator 208 will then generate a unit testing document based on unit testing of the deployed code and will capture corresponding evidence of the results.

Figure 2B:
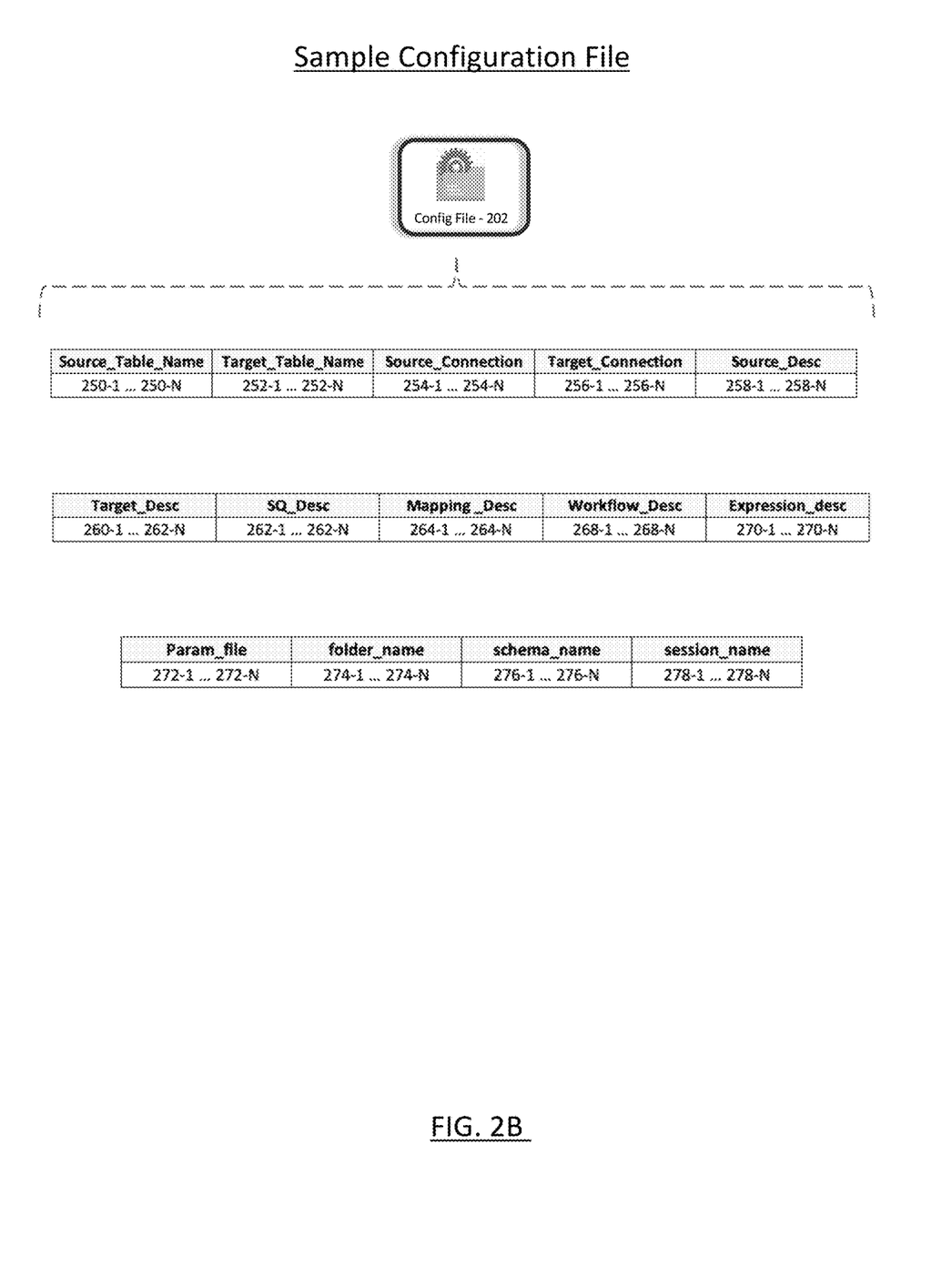
FIG. 2B is a sample representation of data fields and elements that could be included in a configuration file, such as element 202 in FIG. 2A, that can be utilized in conjunction with one or more ETL or other aspects of this disclosure.

FIG. 2B is a sample representation of data fields and elements that could be included in configuration file 202. In general, sample data fields can pertain to source/target names and connections, various descriptions of relevant functions and variables, and file/folder/path information.

As illustrated in FIG. 2B, this may include a Source Table Name (250-1 . . . 250-N) such as a line of business name, a Target Table Name (252-1 . . . 252-N), a Source Connection (254-1 . . . 254-N) such as database connection source information, a Target Connection (256-1 . . . 256-N) such as a database connection stage, a Source Description (258-1 . . . 258-N) such as a description of from where to read data, a Target Description (260-1 . . . 262-N) such as a description of to where data should be loaded, a Source Qualifier (262-1 . . . 262-N) of where to read data from, a mapping description (264-1 . . . 264-N) such as the mapping to read data from and load data into, a Workflow Description (268-1 . . . 268-N) such as the workflow to read data from and load data into, an Expression Description (270-1 . . . 270-N) such as the expression to modify data from, identification of a Parameter File (272-1 . . . 272-N) that can be the name of the file, a Folder Name (274-1 . . . 274-N), a Schema Name (276-1 . . . 276-N), and a Session Name (278-1 . . . 278-N), etc.

Figure 2C:
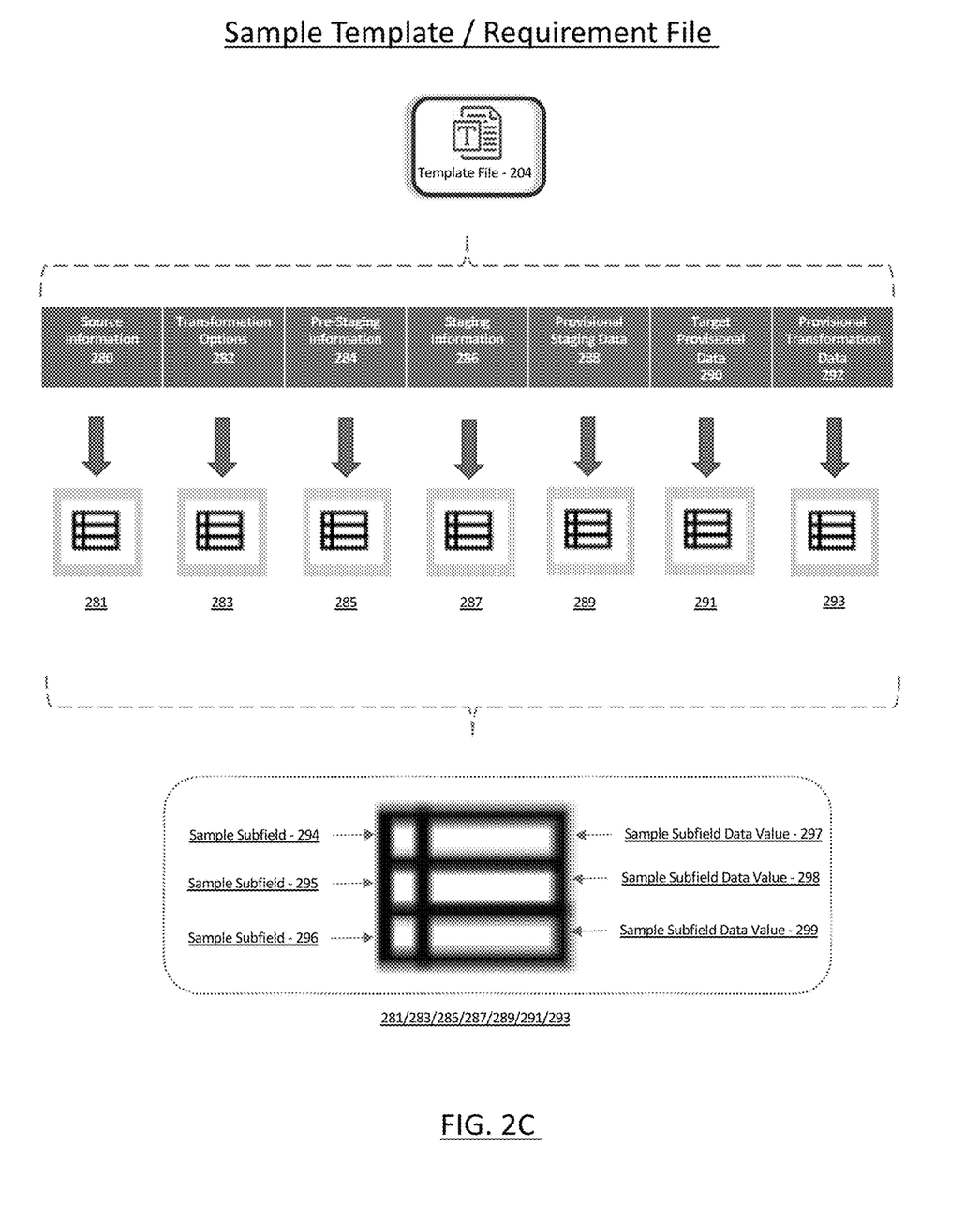
FIG. 2C is a sample representation of data fields and elements that could be included in a template file or requirement document, such as element 204 in FIG. 2A, that can be utilized in conjunction with one or more ETL or other aspects of this disclosure.

FIG. 2C is a sample representation of data fields and elements that could be included in a template file or requirement document 204. At a high level, this can include source information 280 (e.g., system source names, source files or table names, source column names and numbers, source business name, source data type (integers, characters, date/time, etc.), data lengths, sample data values, etc.). Options or selections regarding what transformations to perform on the source data 282 can also be included (e.g., conversion of data from upper case to lower case or vice versa, trimming spaces, the pre-stage table/column/data type/data length, etc.).

Pre-staging information 284, staging information 286, provisional staging data 288, provisional target data 290, and provisional transformation data 292 can also be included (e.g., pre-staging/staging/provisional staging/provisional target/provisional transformation: table names, staging fields, data types, data lengths, data constraints, business identifiers, etc.).

Each of the foregoing data fields and elements in the template file or requirement document 204 can include their own sub-tables (i.e., respectively 281, 283, 285, 287, 289, 291, 293), and each of those can have their own sub-fields 294/295/296 with their corresponding sub-field data values 297/298/299.

Figure 3:
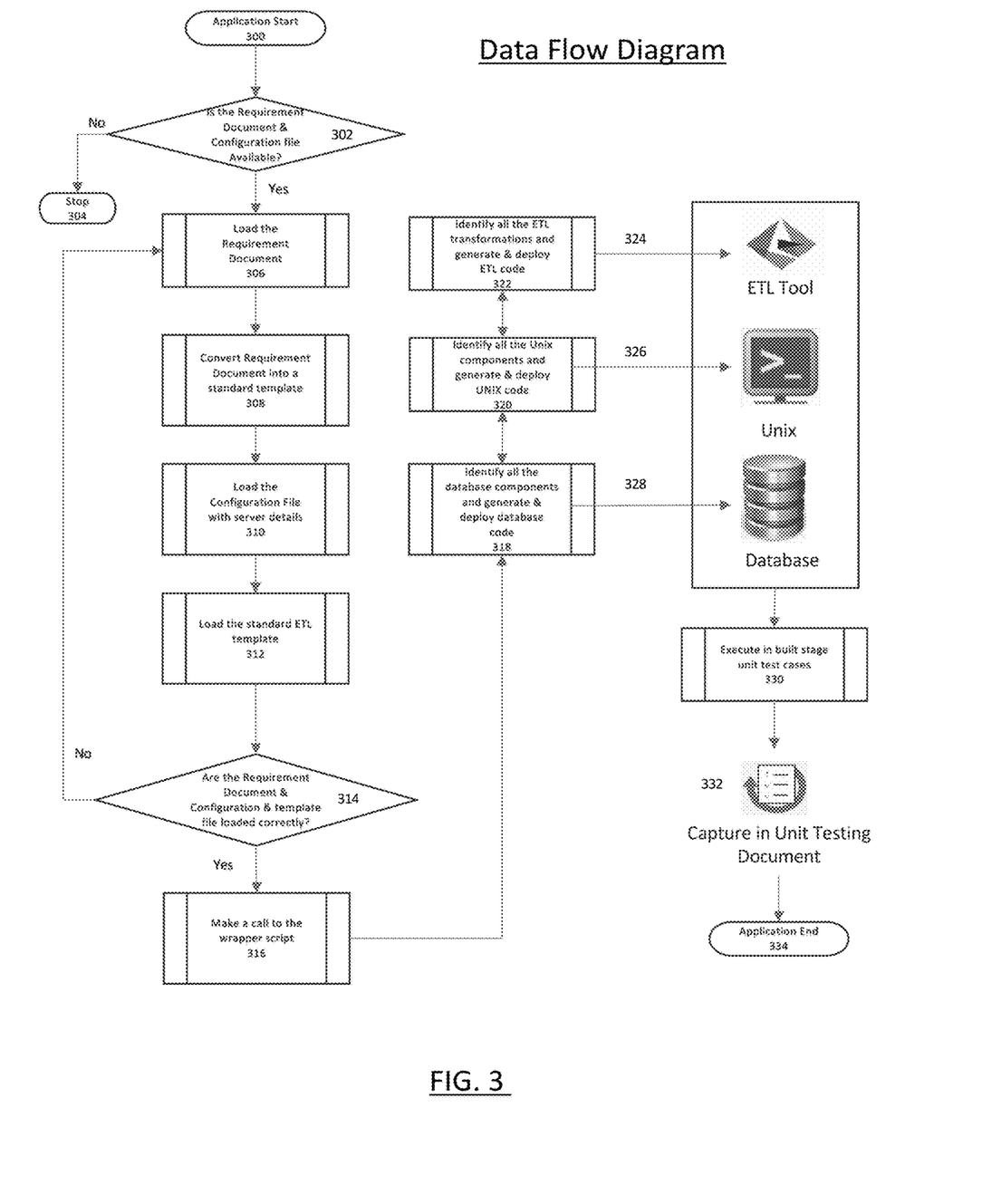
FIG. 3 is a sample data flow diagram for a dynamic code generation utility with configurable connections and variables that can be utilized in conjunction with one or more ETL or other aspects of this disclosure.

FIG. 3 is a sample data flow diagram for a dynamic code generation utility with configurable connections and variables that can be utilized in conjunction with one or more ETL or other aspects of this disclosure.

After starting the application 300, a determination 302 is made as to whether the requirement document and configuration file are available to allow execution of the overall process. If not, the application terminates 304. Otherwise, the requirement document is loaded 306. It is converted into a standard template format 308 such as in an Excel file. From this same template, the configuration file with the server details is loaded 310. The standard ETL template is loaded 312.

A determination 314 of whether the requirement document and template are loaded correctly without any errors is made. If not, the setup process repeats at 306. Otherwise, a wrapper script call is made 316. This identifies all ETL transformations, compiles the files together, and generates the code dynamically. All database components are identified, and the database code is generated and deployed 318. Then they are stored in the database 328.

Similarly, all Unix components are identified, and the Unix code is generated and deployed in 320. Then it is stored 326 in the Unix server.

All ETL transformations are identified and the ETL code is generated and deployed 322, and provided 324 to the ETL tool.

In-built stage unit test cases can be executed on the ETL code and server code 330. The results are captured 332 in a unit-testing document, which can be used for various purposes such as audit trails. After successful generation of the test results, the application terminates 334.

Figure 4:
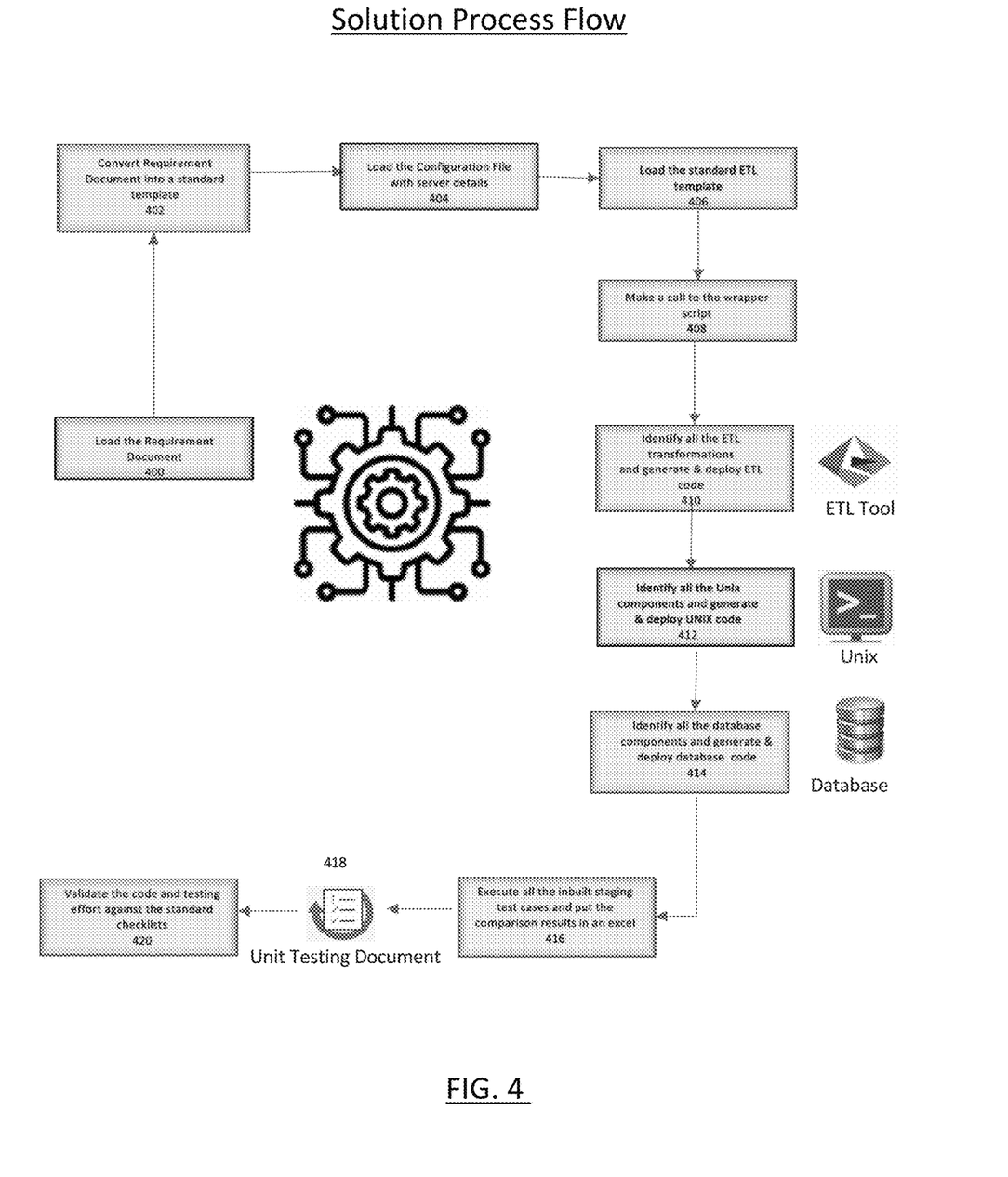
FIG. 4 is a sample solution process flow diagram for a dynamic code generation utility with configurable connections and variables that can be utilized in conjunction with one or more ETL or other aspects of this disclosure.

FIG. 4 is a sample solution process flow diagram for a dynamic code generation utility with configurable connections and variables that can be utilized in conjunction with one or more ETL or other aspects of this disclosure.

The requirement document is loaded 400. The requirement document is converted into a standard template 402. A configuration file with the server details is loaded 404. The standard ETL template is loaded 406. A call is made to the wrapper script 408. All ETL transformations are identified and ETL code is generated and deployed 410, and provided to the ETL tool. All Unix components are identified, and the Unix code is generated and deployed 412, and provided to the Unix server. All database components are identified, and database code is generated and deployed, and is stored in the database. In-built staging test cases are executed 416 and the comparison results are stored 418 in a unit-testing document such as, for example, a spreadsheet file, a document, or the like, etc. The code is validated, and a comparison is made against the standard checklists 420.

Figure 5:
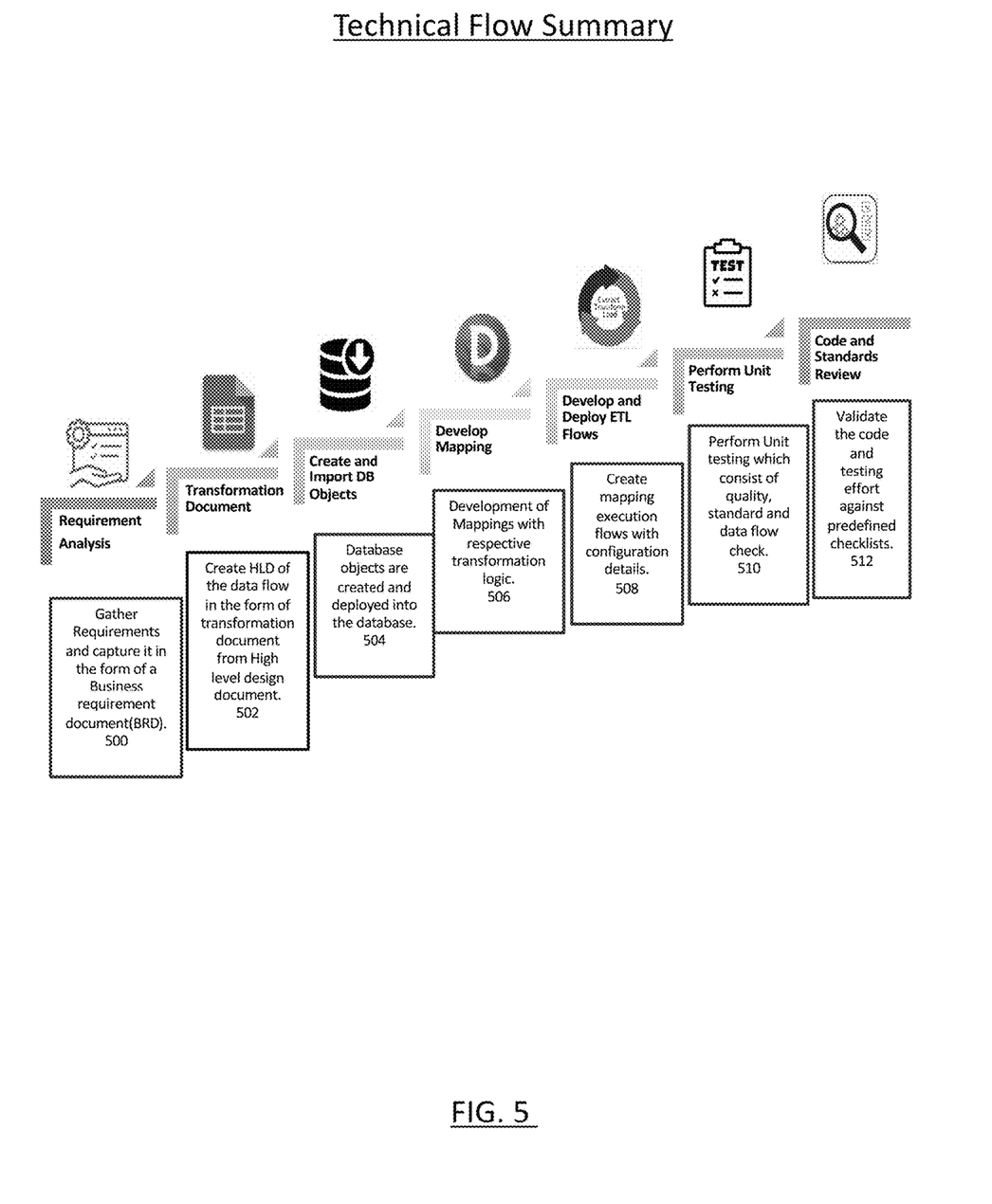
FIG. 5 is a sample technical flow summary for a dynamic code generation utility with configurable connections and variables that can be utilized in conjunction with one or more ETL or other aspects of this disclosure.

FIG. 5 is a sample technical flow summary for a dynamic code generation utility with configurable connections and variables that can be utilized in conjunction with one or more ETL or other aspects of this disclosure.

A requirement analysis is performed to gather the business requirements and capture them in the form of a business requirement document 500. A high-level design document of the data flow is created in the form of a transformation document 502. Database objects are created and deployed into the database 504. Mappings with respective transformation logic are developed 506. Mapped execution flows with configuration details are created 508. Unit testing is performed 510 and consists of quality checks as well as standard and data flow checks.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A dynamic code generation process with configurable connections and variables for extraction, transformation, and load (ETL) processing and validation comprising the steps of:
   (a) loading, by a code generator, an input requirement document from a source, said input requirement document including source information, transformation options, pre-staging information, staging information, provisional staging data, target provisional data, and provisional transformation data;
   (b) converting, by the code generator, the input requirement document into an ETL template;
   (c) loading, by the code generator, the ETL template;
   (d) loading, by the code generator, a configuration file from the source, said configuration file includes a source table name, a target table name, a source connection, a target connection, a source description, a target description, a mapping description, a workflow description, an expression description, a parameter filename for the parameter file, path information for the parameter file, a schema name, and a session name;
   (e) generating, by the code generator, workflows, database objects, and parameters based on the ETL template and the configuration file;
   (f) storing, by the code generator in the parameter file, the parameters;
   (g) deploying, by the code generator, the workflows as ETL code in an ETL repository, said ETL code corresponding to ETL transformations to be performed based on the input requirement document;
   (h) deploying, by the code generator, the database objects as database code in a database;
   (i) deploying, by the code generator in an ETL server, server code corresponding to the ETL code and the database code;
   (j) loading, by a code validator, the ETL code, the database code, and the server code;
   (k) executing, by the code validator, in-built stage unit test cases on the ETL code, the database code, and the server code; and
   (l) capturing, by the code validator in a unit testing document, validation results of the in-built stage unit test cases on the ETL code, the database code, and the server code.

2. The dynamic code generation process with configurable connections and variables for extraction, transformation, and load (ETL) processing and validation of claim 1 in which the ETL code is compiled by the code generator into an ETL tool.

3. The dynamic code generation process with configurable connections and variables for extraction, transformation, and load (ETL) processing and validation of claim 2 in which the server code is compiled into Unix code stored on a Unix server.

4. The dynamic code generation process with configurable connections and variables for extraction, transformation, and load (ETL) processing and validation of claim 3 in which the validation results are compared by the code validator against a checklist.

5. The dynamic code generation process with configurable connections and variables for extraction, transformation, and load (ETL) processing and validation of claim 4 in which the validation results are published by the code validator for peer review.

6. The dynamic code generation process with configurable connections and variables for extraction, transformation, and load (ETL) processing and validation of claim 4 in which the steps are implemented as computer-executable instructions stored on computer-readable media.

7. The dynamic code generation process with configurable connections and variables for extraction, transformation, and load (ETL) processing and validation of claim 1 in which the in-built stage unit test cases validate metadata.

8. The dynamic code generation process with configurable connections and variables for extraction, transformation, and load (ETL) processing and validation of claim 1 in which the in-built stage unit test cases perform a definition comparison.

9. The dynamic code generation process with configurable connections and variables for extraction, transformation, and load (ETL) processing and validation of claim 1 in which the configuration file also includes a parameter filename identifying the parameter file.

10. The dynamic code generation process with configurable connections and variables for extraction, transformation, and load (ETL) processing and validation of claim 1 in which the server code is compiled into Unix code stored on a Unix server.

11. The dynamic code generation process with configurable connections and variables for extraction, transformation, and load (ETL) processing and validation of claim 1 in which the validation results are compared by the code validator against a checklist.

12. The dynamic code generation process with configurable connections and variables for extraction, transformation, and load (ETL) processing and validation of claim 1 in which the validation results are published by the code validator for peer review.

13. The dynamic code generation process with configurable connections and variables for extraction, transformation, and load (ETL) processing and validation of claim 1 in which the steps are implemented as computer-executable instructions stored on computer-readable media.

\* \* \* \* \*